April 10, 1956
C. E. BECKWITH
2,741,448
MOUNTING BRACKET FOR MEASURING INSTRUMENT
Filed March 25, 1952
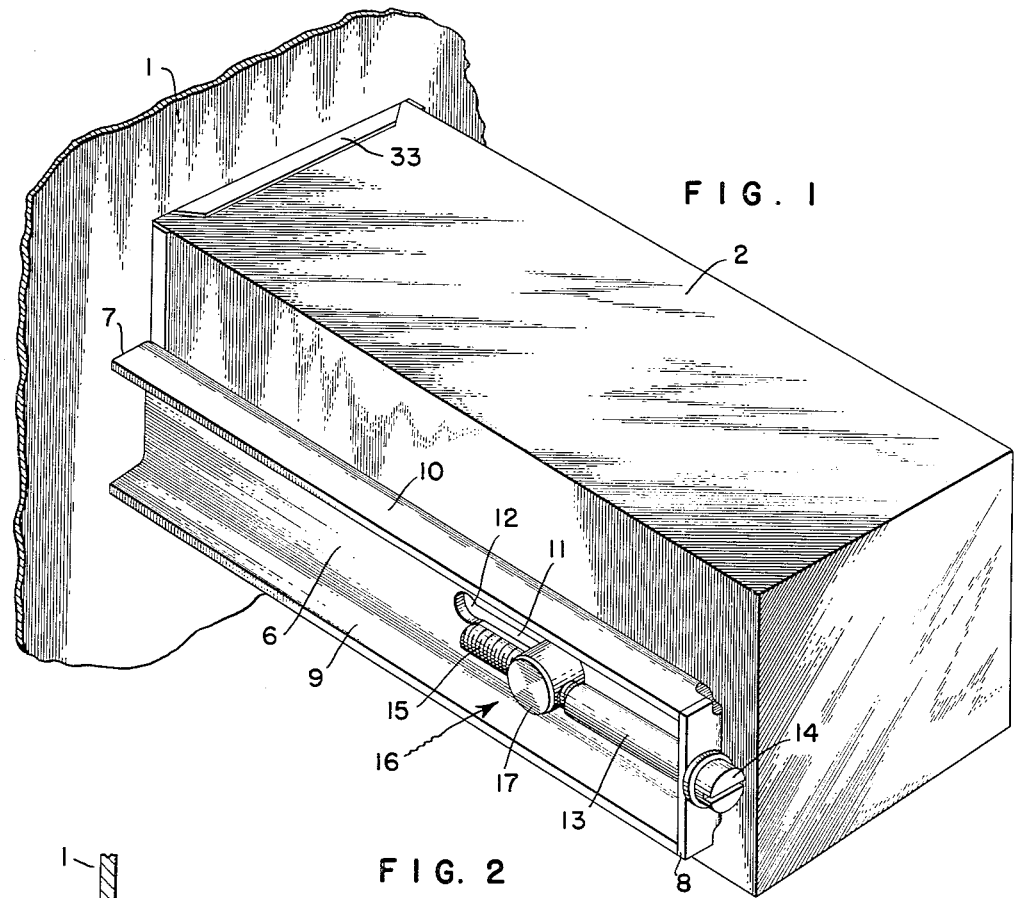
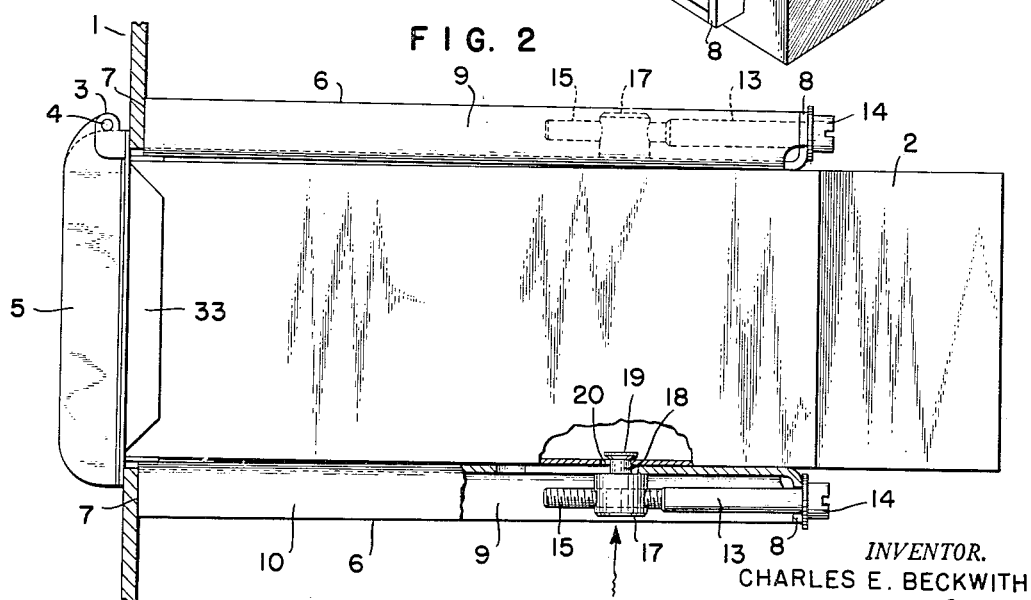
INVENTOR.
CHARLES E. BECKWITH
BY *Arthur H. Swanson*
ATTORNEY.

United States Patent Office 2,741,448
Patented Apr. 10, 1956

2,741,448
MOUNTING BRACKET FOR MEASURING INSTRUMENT

Charles E. Beckwith, Abington, Pa., assignor to Minneapolis-Honeywell Regulator Company, Minneapolis, Minn., a corporation of Delaware Application March 25, 1952, Serial No. 278,521

2 Claims. (Cl. 248—27)

This invention relates to means for supporting industrial-process-controlling instruments, particularly recorders.

The modern trend in such instruments is towards small devices which can be mounted on an instrument board or panel so as to occupy but a minimum space thereon. In order to accommodate the necessary component parts the casing containing these parts must project for a considerable distance behind the panel. This means that the center of gravity is far removed from the panel. Therefore, it is necessary to provide an adequate support for the case particularly since the component parts of the instrument may be removed for adjustment or repair and then restored. Moreover, large numbers of such instruments are located side-by-side on the instrument board or panel and, since the cases project for a considerable distance to the rear of the panel, the screws by means of which the supporting bracket for these cases are connected and disconnected are located near the front of the case and are relatively inaccessible from the rear of the panel.

It is an object of this invention to provide a mounting bracket for a case which encloses the component parts of an industrial-process-controlling instrument, such as a recorder, which mounting bracket supports the casing to ready attachment to or removal from the supporting instrument board or panel.

More particularly it is an object of this invention to provide readily attachable and detachable means, such as a screw rotatable by a screw driver or the like, which screw is located near the rear of the case and its supporting bracket so that the screw is readily accessible to one working behind the panel to attach and detach such a case thereto or therefrom.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a perspective view of the rear of the bracket and case supported thereon.

Fig. 2 is a top or plan view with parts broken away in horizontal, longitudinal cross section.

Figs. 1 and 2 show an instrument board or panel 1, which is usually of sheet steel, and which has a perforation through it through which perforation the front end of the instrument casing projects. This casing 2 has five walls, top, bottom, two side and rear end. This case may conveniently be made of hot rolled annealed sheet steel approximately 0.0478 inch in thickness and enameled in any suitable color such as gray or black. At the front end of the casing 2 flanges 33 project sidewise therefrom. Hinges 3 are mounted on flanges 33 and support pins 4 by means of which a cover 5 is attached to the case and rotates relative thereto. Cover 5 may conveniently be made of transparent plastic. This case contains a motor, a strip chart driven by the motor, a scale, and a pen movable with relation to the scale and the chart so as to mark upon the chart the instantaneous value of the variable being measured. This variable is measured by a suitable measuring element which is suitably connected to the pen to move it across the chart and relative to the scale.

In order to support the casing 2 and the parts contained therein, a suitable bracket is provided. This supporting bracket comprises duplicate parts of which but one will be described. Channel beam 6 is of generally U-shape in transverse, vertical cross section. Channel 6 is supported at its front end 7 upon the panel or instrument board 1. At the opposite or rear end channel 6 has a flange 8 bent up into abutment with the ends of the side flanges 9 and 10. The rear flange 8 has a perforation through it. Channel 6 is conveniently made of cold rolled steel sheet approximately 0.1196 inch in thickness. Through the back or vertical wall of channel 6 is an elongated slot 11 having an enlarged head 12.

Through the hole in the rear flange 8 passes a screw 13 having an enlarged head 14 and a screw threaded portion 15 of reduced cross section.

Screw threadedly mounted on portion 15 of screw 13 is a stud 16 having an enlarged body 17 through which passes a generally horizontal hole having screw threads adapted to mate with those of screw threaded portion 15. At its inner end stud 16 has a neck 18 of reduced cross section on the end of which is a head 19 having a frusto conical face. Head 19 is adapted to pass through a hole 20 in the side wall of the case 2. This hole 20 is approximately aligned with the center of gravity of case 2 and the parts carried thereby.

In order to attach the case 2 to the panel or instrument board 1, the case is slid from the front through the opening in panel 1 so that case 2 projects to the rear of panel 1. The heads 19 of studs 16 are passed through the holes 12 in the channels 6 and through the holes 20 in the sides of the case 2, these holes being aligned for this purpose. The screws 13 are then passed through the holes in the rear flanges 8 so that their screw threaded portions 15 enter the holes in the bodies 19 of the studs 16. Screws 13 are then rotated clockwise. Since the heads 14 of the screws 13 abut the rear faces of the rear flanges 8, clockwise rotation of screws 13 draws the studs 16 back along the slots 11 until the necks 19 of the studs 16 engage the rear sides of holes 20 in case 2. Since the rear face of flange 33 engages the front face of panel 1, the case 2 is held against rearward movement and the channels 6 are moved forward until the front ends of the channels 6 engage the rear face of the panel 1. By this means the case 2 is held securely and snugly in position. The case 2 can be removed from panel 1 by loosening the screws 13 and reversing this operation.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Means for supporting on a panel, having an opening therethrough, an instrument casing having a flange extending around one end of said casing and having a perforation through each of the side walls thereof, said means including a U-shaped channel having a web and an elongated slot in said web, said slot having a large portion and a small portion, a stud having a head of suitable size to pass through the large portion of said slot and not through the small portion and to pass through the perforation in said casing and to engage the inner wall of said casing adjacent said perforation, said stud also having a neck adapted to be located in the small portion of said slot and in said perforation and to engage one of the side walls of said perforation, and a screw rotatably mounted on said bracket and having screw-threaded engagement with said stud so that, upon rotation of said screw, said flange is drawn against the front of said panel and the front end of said bracket is drawn against the rear of said panel so as to mount said casing rigidly on said panel.

2. A bracket for mounting on a panel having an opening therethrough, an industrial process recorder including, a case having at its front end a flange projecting sidewise therefrom, said case projecting through said opening for a considerable distance to the rear thereof, said bracket including, a pair of substantially U-shaped channels each having a horizontal top wall and a horizontal bottom wall and a vertical web connecting said top and bottom walls and having a hole therein, each of said channels abutting at one of its ends upon the rear of said panel, the web of each of said channels extending along one vertical wall of said case, the vertical walls of said case each having a hole therein adapted to be aligned in one position of said case with a hole in one of said webs, a vertically extending perforated flange at the opposite or rear end of each of said channels, studs each having a perforated body portion and a neck of reduced cross section adapted to be located in a hole in said case and in one of said channels and a head adapted to engage with the inner wall of said case, and screws each passing through the perforation in one of said rear flanges and through the perforation in the body of one of said studs and having screw threaded engagement with said stud so that said screws can be tightened to draw said studs away from said panel so as to clamp said case in position on said channels.

References Cited in the file of this patent
UNITED STATES PATENTS

| | | |
|---|---|---|
| 1,710,093 | Kintzele | Apr. 23, 1929 |
| 2,440,324 | Blakeslee | Apr. 27, 1948 |
| 2,505,588 | Smith | Apr. 25, 1950 |
| 2,531,107 | Burkey | Nov. 21, 1950 |
| 2,562,260 | Caldwell | July 31, 1951 |